United States Patent [19]

Emeny

[11] 4,195,968
[45] Apr. 1, 1980

[54] LIQUID LEVEL CONTROL

[76] Inventor: George B. Emeny, 83 Hilltop Pl., New London, N.H. 03257

[21] Appl. No.: 825,866

[22] Filed: Aug. 19, 1977

[51] Int. Cl.$^2$ .................... F04B 49/02; F04B 49/06
[52] U.S. Cl. ........................................ 417/17; 417/45
[58] Field of Search ............... 318/474, 476, 481; 417/38, 17, 45

[56] References Cited

U.S. PATENT DOCUMENTS

| 2,697,195 | 12/1954 | Courtney | 318/474 |
| 2,811,019 | 10/1957 | Courtney | 417/45 |
| 2,856,574 | 10/1958 | Schaeffer | 318/474 |
| 2,947,931 | 8/1960 | Hubby | 318/474 |
| 3,778,694 | 12/1973 | Hubby et al. | 318/474 |
| 3,829,241 | 8/1974 | Emeny | 417/17 |
| 3,858,102 | 12/1974 | Quinn | 318/474 |

FOREIGN PATENT DOCUMENTS 676051  5/1939  Fed. Rep. of Germany ............. 417/45

Primary Examiner—William L. Freeh
Attorney, Agent, or Firm—Webb, Burden, Robinson & Webb

[57] ABSTRACT

A liquid level control for the operation of a sump pump or the like intermittently removing liquid from a sump or pit. The control starts the pump when the liquid level reaches a preset high level and maintains the pumping until the liquid reaches a preset low level. The control comprises a first switch which closes in response to the liquid crossing the preset upper level and a second switch preferably in parallel therewith which closes in response to pump motor current such that when the first switch starts the pump, the second switch maintains the pump in the on position.

2 Claims, 1 Drawing Figure

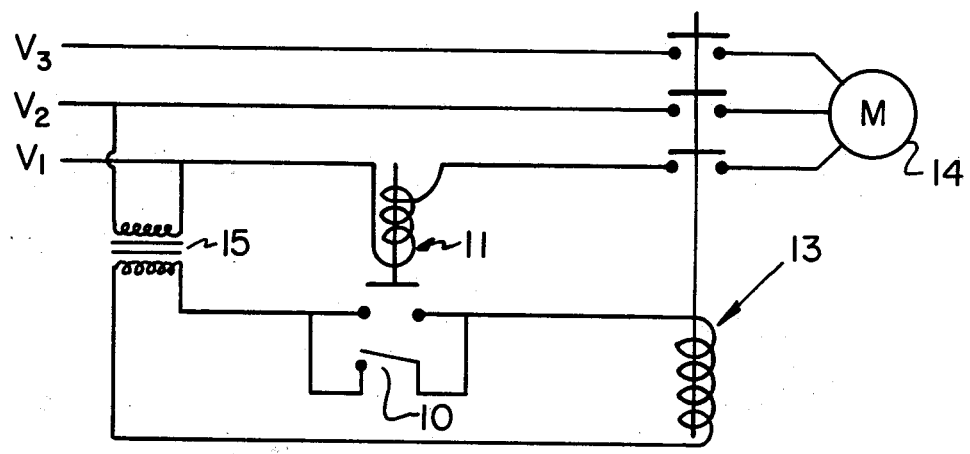

LIQUID LEVEL CONTROL

This invention relates to a liquid level control and more particularly to a device for the activation of a sump pump when the liquid in a sump or pit reaches a predetermined high liquid level and for the deactivation of the sump pump when the liquid reaches a predetermined low level.

In deep sumps or pits conventional methods of pump control may be cumbersome or unreliable. Since a float control usually involves a float which is guided by some means submerged in the sump or pit, corrosion of these parts or the adherence of foreign substances to these parts may cause the float to stick or bind. Further, floats can be disturbed by high liquid turbulence in the sump. Finally, a mechanical failure such as loss of retaining collars can also cause float controls to become inoperative. Electric control is also subject to the difficulties inherent in having a portion of the control mechanism extend below the liquid level, for example, the electrodes may become fouled because of a sludge coating or corrosion of the electrodes. Bulbs submerged below the liquid level to transmit controlling pressure to the control switch are also subjected to deterioration. Any mechanical element above or below the liquid level can be troublesome. For example, chain supports of floats require guide members which are subject to corrosion and binding or breakage.

My U.S. Pat. No. 3,829,241 is directed to one solution to the above mentioned problems.

It is an advantage according to this invention that the problems inherent in certain prior art liquid level control systems are overcome.

Briefly, according to this invention, the liquid level control comprises a switch for activating the pump when the upper liquid level is reached. Numerous such switches are available which are not submerged below the upper liquid level. Further, a second switch is provided which is responsive to the current in the pump motor. The second switch maintains the pump activated until current in the pump motor falls due to decrease in motor load.

Further features and other objects and advantages of this invention will become clear to those skilled in the art from the following detailed description made with reference to the drawings in which FIG. 1 is a schematic drawing of one embodiment of the electrical system according to this invention.

Typically, a sump is arranged (or designed) to accumulate liquid to a certain high level whereupon the liquid is removed by a sump pump until a certain low level in the sump is reached. An upper liquid level sensing device may be arranged above the upper liquid level. This device and the pump may be mounted on a sump cover plate. The pump activated by an electrical motor may have a pumping chamber located above or below the liquid level in the sump.

The upper liquid level sensing device may be of any type to sense the upper liquid level and thereby to activate the pump motor either directly or through a relay switch or starter. Preferably, according to this invention, a pressure sensitive switch is activated as the liquid rises in a tube compressing the entrapped air therein. A starting switch is satisfactory if compression of the air in its compression tube will cause the switch to close at the desired upper liquid level and to open before the liquid level drops below the open end of the compression tube. Any alternate satisfactory method of starting the pump may be used, also.

A control device for maintaining the pump activated is responsive to pump motor current. As soon as the pump starts, current starts to flow in the pump. The control device is adjusted so that when the pump has lowered the liquid in the sump to the predetermined level, the resulting decrease in motor current deactivates the control, thus stopping the pump motor.

Referring now to the drawing, the electrical system may comprise the starting control switch 10 arranged in parallel with the maintaining switch 11 to connect an electrical power source $V_1$ to a relay solenoid 13. The relay when closed connects the 3 phase electrical power to the pump motor 14. Typically, the maintaining switch may be a magnetic, adjustable current relay which closes its contacts upon receiving normal current and opens these contacts when a certain lower current level is encountered. Its high voltage terminals are wired into one phase of the motor power source, and its control voltage terminals are wired from the control voltage transformer 15 to the motor starter solenoid 13. The starting control switch 10 is wired in parallel to it. If the service and pump motor requires single phase power, the circuit shown in the drawing with the $V_3$ details omitted provides the necessary circuitry. Other electrical circuits may be arranged to provide the same function for example, the starting switch and the maintaining switch may be arranged to close relay switches which are themselves arranged in parallel between the line voltage phases and the motor 14.

In operation, when the desired upper liquid level is reached, the control device 10 closes its contact and activates the pump starter which starts the pump motor. Before the liquid level in the sump starts to recede below the point where the control switch 10 opens its contacts, the motor current causes the contacts of control switch 11 to close. Thus, switch 11 continues the activation of the pump until it is deactivated by the decrease in pump motor current.

Switch 11 is closed by the starting current of the pump motor and decreases when the running current of the pump motor decreases below the normal pumping amperage or where it simply becomes greatly reduced. The "pull-in" and "drop-out" current levels inherent in the magnetic current relay 11 may be used to accomplish this result. When the pump has lowered the liquid to the level of the bottom of the suction pipe thereby eliminating flow of liquid through the pump, the pumping load ceases and the motor current is reduced. However, if the impeller shaft is broken, the pumping load will also be reduced and the motor current decreased sufficiently to cause the maintaining switch to open. Hence, this invention provides protection against the failure of the impeller shaft. Further a restricting influence might occur in the fluid path causing flow reduction sufficient to reduce the motor current to the point of opening the relay and stopping the motor until the starting pressure switch 10 reinitiates the pumping cycle.

In this application, the word sump can mean any vented tank, pit or other reservoir for holding liquid to be transferred by pumping or valving means or otherwise having its liquid level controlled between predetermined limits.

Having thus defined my invention in detail and with the particularity required by the Patent Laws, what is desired protected by Letters Patent is set forth in the following claim.

I claim:

1. A liquid level control for activating a pump motor when the liquid reaches an upper level and for deactivating the pump motor when the liquid reaches a lower level comprising:
   at least one relay switch in the electrical power supply conduits leading to the pump motor for supplying current to the pump motor,
   a relay pull-in coil power supply circuit in parallel with said pump motor,
   means responsive to the liquid level for controlling a first control switch in said relay coil power supply circuit such that the switch closes when the upper liquid level is reached and remains closed until the liquid level recedes somewhat below the upper liquid level,
   means responsive to the pump motor current for controlling a second control switch in said relay coil power supply circuit such that the switch closes when the pump motor begins to draw current and remains closed until the current drawn by the pump falls below the current drawn during normal pumping,
   said first and second control switches being connected in parallel,
   said relay switch controlling the electrical power to said pump motor whereby the first control switch activates the relay and the pump motor at least for a time sufficient to activate the second control switch to maintain the relay closed until pump motor current decreases.

2. A liquid level control according to claim 1 wherein said means responsive to the pump motor current comprises a second relay switch the energizing coil of which is in series with the relay switch and the pump motor.

* * * * *